March 8, 1932.

J. B. HADAWAY

Re. 18,375

TRIMMING MACHINE

Original Filed May 9, 1929 2 Sheets-Sheet 1

INVENTOR
John B. Hadaway
By his Attorney
Victor Cobb.

March 8, 1932. J. B. HADAWAY Re. 18,375

TRIMMING MACHINE

Original Filed May 9, 1929 2 Sheets-Sheet 2

INVENTOR
John B. Hadaway
By his Attorney
Victor Cobb.

Reissued Mar. 8, 1932

Re. 18,375

UNITED STATES PATENT OFFICE

JOHN B. HADAWAY, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Original No. 1,793,481, dated February 24, 1931, Serial No. 361,611, filed May 9, 1929. Application for reissue filed May 19, 1931. Serial No. 538,531.

This invention relates to trimming machines and is herein illustrated as embodied in a machine designed to operate on lasted shoes in which the overdrawn margins of upper material lie in confronting relation to the insoles and are secured thereto so that surplus portions of said margins may be severed.

In shoes of certain types the margins referred to extend inwardly beyond the holding means by which they are secured to the insoles, the unsecured portions inside the lines of connection being surplusage after completion of the lasting operation. Consequently, it is common to trim these unsecured portions wherever they are too wide.

With regard to these conditions an object of the present invention is to provide an improved machine adapted to trim margins of the character above described, with a view to rapidity and ease of operation.

Accordingly a feature of the invention consists in a machine comprising a movable shear member formed and arranged to run between the insole of a lasted shoe and an overdrawn margin of upper material confronting the insole, mechanism by which said member is operated to flex said margin away from the insole, and means arranged to cooperate with said member to sever said margin with a shearing cut. Preferably, and as shown herein, the other member of the shearing couple also executes shearing movement, and its lines of movement preferably cross those of the shear member that runs between the insole and the overdrawn margin of upper material. Thus, the dissimilar movements of the shear members produce a draw cut which facilitates the severing, more especially when relatively thick or hard materials are encountered, as, for example, seams, toe-stiffeners, pleats at the toe end of a shoe, and the flanges of counter-stiffeners which commonly lie between the uppers and linings. However, in its broad aspect, the invention does not require movement of the shear member that operates against the outer surface of an overdrawn margin.

Referring to the shear member that operates between the insole and an overdrawn margin, satisfactory results have been obtained with a reciprocatory blade provided with a pointed, wedge-shaped portion having a shearing edge slightly inclined with respect to the lines of reciprocation imparted thereto. Thus, as this member moves point foremost in lines substantially parallel to the shearing cut its shearing edge operates with a wedging action to deflect surplus material of an overdrawn margin away from the insole, its rate of reciprocation being sufficiently rapid to take advantage of the inertia of a shoe so that no appreciable manual effort will be required to resist the repeated thrusts due to such reciprocation.

As herein illustrated the above-mentioned pointed blade is adjustably clamped in a holder so that it may be advanced, from time to time, as it grows shorter in consequence of being sharpened repeatedly. Preferably this blade is formed with a groove extending longitudinally thereof in the face against which the chip or trimming of waste material bears as the trimming progresses, the groove being effective both to facilitate the feeding of the work and the sharpening of the cutter. With respect to facilitating the feeding of the work, the groove is arranged to receive an edge of the material trimmed by the blades, thereby diminishing the extent of lateral deflection of the material so that the work may be fed with less opposition than if the deflection were commensurate with the maximum thickness of the blade. With respect to facilitating sharpening the blade, the aforesaid groove diminishes the burden on an abrading element by which the blade is sharpened.

Still another object of the invention is to provide improved and simplified mechanism for operating a pair of cooperative shear members organized to operate as above described. To this end a feature of the invention consists in a novel combination comprising a pair of reciprocatory shear members cooperatively related, and mechanism arranged to operate them, one with relatively long strokes and the other with relatively short strokes. As herein illustrated, the shear members both receive operating motion from a common operating member, but the motion for one of them is transmitted by a toggle link which increases its power and reduces its range of motion. As herein illustrated this toggle mechanism is utilized to operate the shear member that functions between the insole and an overdrawn margin of upper material.

Referring to the drawings,

Figs. 2 and 5 illustrate a typical example of a lasted shoe in which the overdrawn margins of upper material lie on the bottom face of the insole and require trimming in the shank portion of the shoe to provide a channel for the reception of a shank-stiffener.

Figures 1, 2:
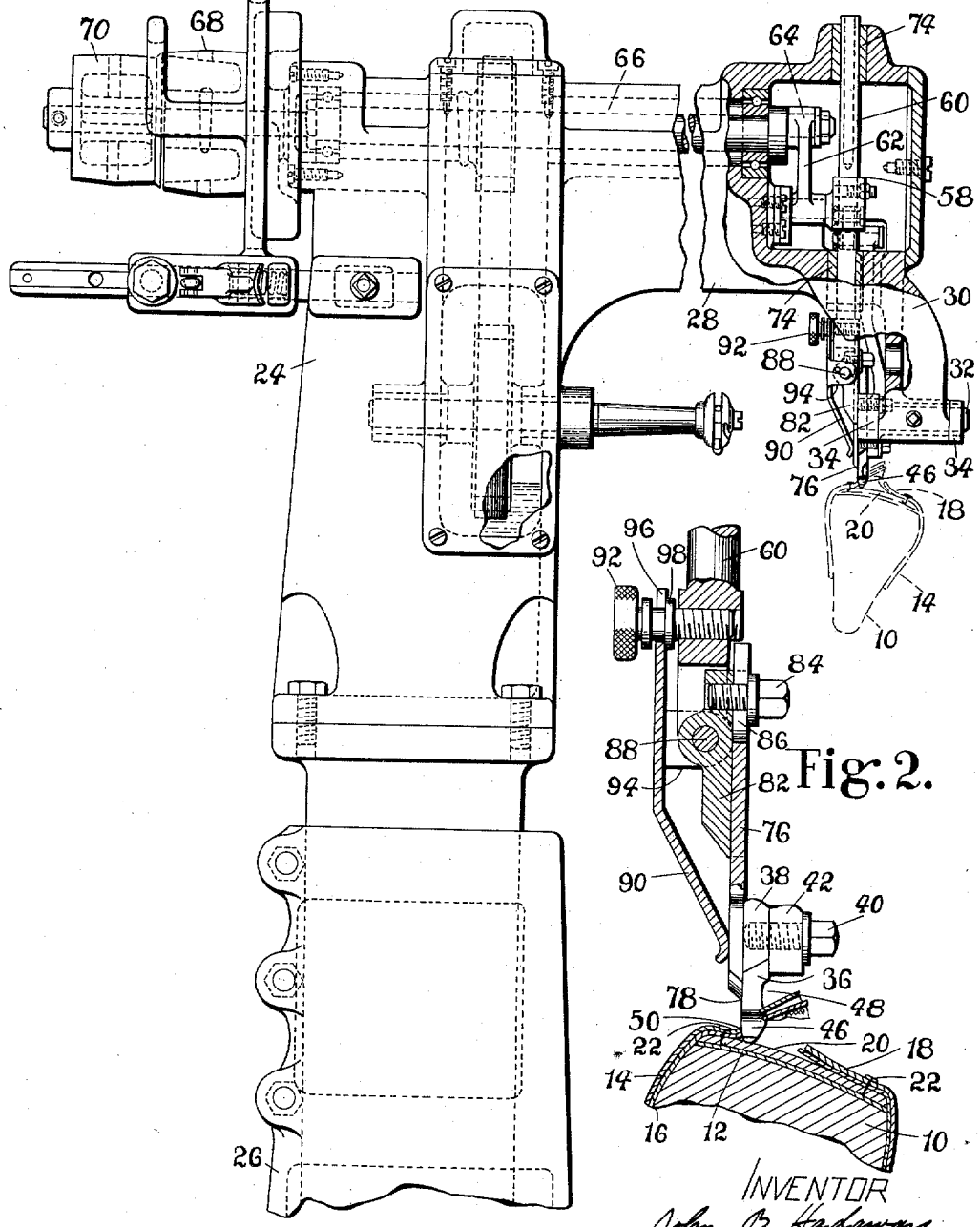
Fig. 1 is a side elevation, partly in section, of a trimming machine embodying the several features of this invention, the front of the machine being at the right of the figure.
Fig. 2 is a vertical section, on a larger scale, including the trimming cutters and a portion of a lasted shoe in process of being trimmed.

In accordance with the procedure followed in the manufacture of a shoe of the type shown, Fig. 2 illustrates a portion of a last 10, the bottom face of which (the last being inverted in this figure) is shod with a metal plate 12. For the purposes of this description the upper 14 and the lining 16 (with or without a toe-stiffener and a counter-stiffener) will be hereinafter referred to collectively as the upper material. In the course of lasting the shoe, the overdrawn margins 18 of the upper material are laid upon the bottom face of the insole 20 and are secured thereto by any suitable means, for example, fasteners, herein represented as lasting tacks 22. As the tacks are driven through the upper and the insole their points encounter the metal plate 12 and are turned back and clenched in the insole. It is to be observed that in a shoe of the type illustrated, the bottom face of the insole is plain, that is, not interrupted by any shoulder or rib. Thus, when the overdrawn margins are secured to the insole they lie in confronting relation to the bottom face thereof.

According to common practice, the illustrated upper and lining are initially cut to provide surplus material by which the grippers of a lasting apparatus may maintain a sufficient hold upon the margins 18 while the upper material is being shaped and while the margins are being secured to the insole. Subsequently, it is desirable and commonly necessary to sever some of this surplus material, particularly in the shank portion to provide a channel for a shank-stiffener, and also at the toe of the shoe where the overdrawn margin 18 is commonly pleated incidentally to shaping the upper to the toe of the last.

The machine hereinafter described is useful to trim surplus material from the margins 18 not only along the shank portion of a shoe but also along the sides of the forepart and around the toe thereof, the extent of trimming, in each instance, being determined by the trimming operator according to the quantity of surplus material lying inside the line of connection between the margins and the insole.

Figure 3:
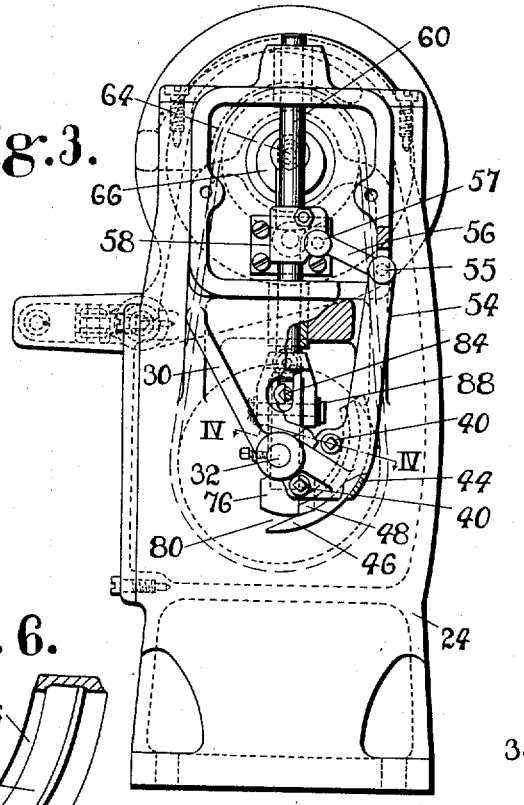
Fig. 3 is a front elevation, partly in section, of the upper portion of the machine shown in Fig. 1.
Figure 4:
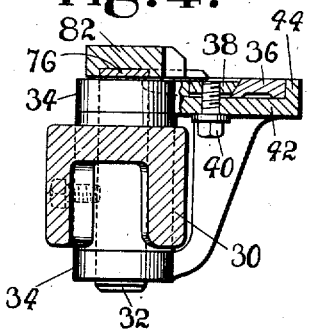
Fig. 4 is a section, on a larger scale, of the elements intersected by broken line IV—IV of Fig. 3.
Figure 5:
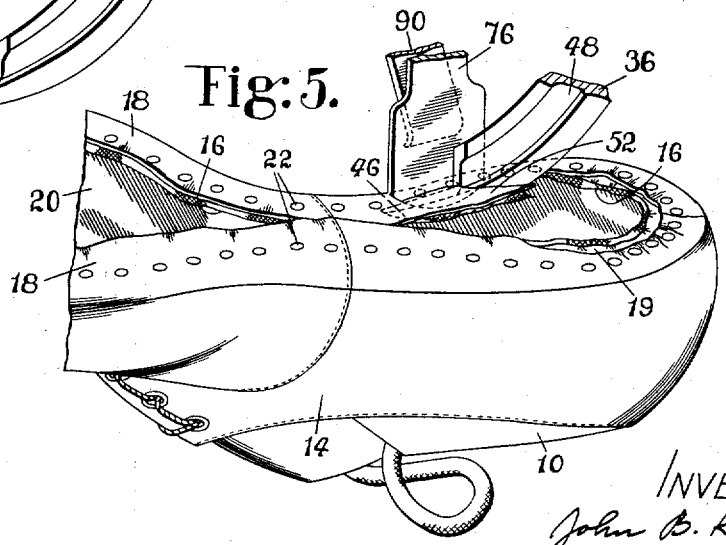
Fig. 5 is a perspective view of a portion of a lasted shoe in process of being trimmed, and includes fragments of the cutters in the act of executing a shearing cut.

The illustrated machine comprises a head or frame 24 mounted upon a supporting column 26, an overhanging portion 28 of the frame is provided with a depending arm 30, the lower end of which is bored horizontally for the reception of a pivot pin 32. The ends of this pin project beyond the arm sufficiently to extend through two branches 34 of a holder in which a flat cutting blade 36 is adjustably clamped by a plate 38 and two clamping bolts 40, as shown in Fig. 4. Mechanism hereinafter described is provided to oscillate this blade-holder about the axis of the pin 32. The blade 36 is preferably of arcuate shape as shown in Figs. 3 and 5, the curvatures of its inner and outer surfaces being concentric. Corresponding arcuate shapes are given to the clamping plate 38 and to the clamping portions of the blade-holder, specifically the flat bed portion 42 and the flange 44 thereof. The abutting surfaces of the blade 36 and the clamping plate 38 are beveled as illustrated in Fig. 4 so that when the plate is set up tightly by the bolts 40 it will exercise two components of clamping pressure by one of which the outer curved surface of the blade 36 will be clamped against the flange 44 and by the other of which a flat face of the blade will be clamped against the flat bed 42. The described clamping means provides for adjusting the blade lengthwise of its lines of curvature to compensate for reductions in its length as it is ground, from time to time, to sharpen its shearing edge.

Figure 6:
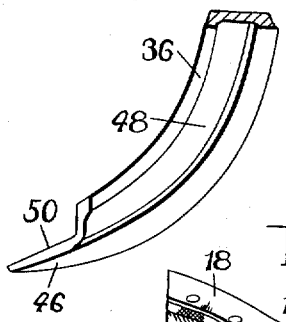
Fig. 6 is a perspective view of a portion of one of the shearing cutters.

As shown in Figs. 3 and 6, the inner margin of the blade 36 is ground away to provide a narrow wedge-shaped pilot or projection 46 forming a continuation of the outcurved margin, and to provide on said projection a shearing edge 50 extending lengthwise thereof and facing the axis of the pin 32 but slightly inclined. When the blade 36 is adjusted as shown in Figs. 3 and 5, the projection 46 lies under the axis of the pivot pin 32 so that as the blade is oscillated, as hereinafter described, the projection will move lengthwise in lines approximately parallel to the confronting surfaces of the insole and a margin 18 of a shoe. Thus, the outcurved bottom surface of the projection 46 is arranged to run on the upturned surface of the insole of a lasted shoe without imparting any appreciable deflection to the shoe, while the inclined shearing edge 50 bends the surplus upper material upwardly with successive wedging actions. The tip of the projection 46 is not sharp enough to penetrate the materials of which a shoe is made but is pointed enough to enter readily between the insole and an overdrawn margin 18 of the upper.

A groove 48 is preferably formed in the body of the blade 36 in the flat face opposite that on which the shearing edge 50 is formed, said groove extending lengthwise of the blade and its forward end being about in line with the shearing edge 50 to receive the chip or trimming 52 of waste material, as illustrated in Figs. 2 and 5. The body of the blade runs in the cut formed in the work and deflects the chip 52 laterally, but the abruptness of such deflection is modified by the groove, with the result that less effort is required to feed the work than if the full thickness of the blade were maintained at the point of deflection. Moreover, as the blade is ground back incidentally to sharpening the shearing edge 50, the burden upon the grinding element is correspondingly lessened by the groove.

The illustrated mechanism for reciprocating the blade 36 includes an arm 54 (Fig. 3) formed on the blade-holder 42, a link 56, the ends of which are pivotally connected respectively to the arm 54 and to a block 58, a vertically movable plunger 60 to which the block 58 is affixed, a connecting rod 62 pivotally connected to the block 58, and an eccentric wrist-pin 64 carried by an operating shaft 66. The shaft is mounted in bearings in the frame 24 and is provided with a tight pulley 68 and a loose pulley 70 on which a driving belt may run. A shipper 72 is provided for shifting the belt back and forth from one pulley to the other. The plunger 60 is arranged in bearings 74 in the overhanging portion 28 of the frame and projects below said portion to provide a mounting for a vertically movable flat chisel-shaped shearing blade 76 hereinafter described.

As shown in Fig. 3, the plunger 60 is at the upper limit of its stroke and the pivot pin 57 connecting the link 56 and the block 58 is slightly above the level of the pivot pin 55 connecting the link and the arm 54. Thus, as the plunger 60 decends to impart a cutting stroke to the blade 76 it also imparts a relatively slight angular motion to the arm 54, the action of the link 56 being that of a toggle member. As this motion takes place, the projection 46 at the lower end of the blade 36 moves point foremost in lines crossing the lines of reciprocation of the blade 76, although its extent of motion is small compared to the extent of motion imparted to the blade 76. If, when this motion occurs, the projection 46 lies between two elements of the work such as the insole and an overdrawn margin 18 of the upper of a lasted shoe the shearing edge 50 will lift the overlying material with a wedging action and at the same time the shear members will execute a draw cut.

The lower end of the blade 76 is sharpened to form a chisel-like shearing edge indicated at 78 in Fig. 2, this edge being arranged to move to and fro across the shearing edge 50 and to cooperate therewith. Preferably, and as shown, the shearing edge 78 is curved to provide a substantially V-shaped gap between the blades when the blade 76 is raised, this gap being indicated at 80 in Fig. 3. The blade 36 is so adjusted that its body portion will always be in lapped relation to the blade 76 and thus maintain the shearing relation of the shearing edges 50 and 78.

Referring to Fig. 2, the blade 76 is clamped rigidly to a holder 82 and is mortised therein as shown in Fig. 4. The connection is formed by a bolt 84, a vertical notch 86 being formed in the blade to receive the shank of the bolt and to provide for vertical adjustment of the blade 78 so that its shearing edge will travel across the shearing edge 50 but not descend to the level of the bottom of the projection 46. The holder 82 is carried by the plunger 60 and is connected thereto by a horizontal hinge-pin 88 which enables the blade 76 to bear continually against the blade 36 notwithstanding any loose play of the parts that may develop in the use of the machine. A leaf-spring 90 is arranged to maintain pressure of the blade 76 against the blade 36 and is provided with a thumb-screw 92 by which the applied force of such pressure may be regulated. The spring 90 is provided with ears 94 that straddle the lower end of the plunger 60. These ears are bored for the reception of the ends of the hinge-pin 88 by which the spring is carried. The regulating screw 92 is carried by the plunger 60 and extends through a notch 96 formed in the spring 90. A flange 98 formed on the screw bears against the spring to maintain deflection thereof for the purpose stated.

In using the machine to trim surplus materials lying on the insole of a lasted shoe, the operator first inserts the point of the projection 46 between the insole and the surplus material about to be trimmed. The surplus material thus enters the gap 80 (Fig. 3), and as the operator advances the shoe manually the blade 76, which is reciprocated at a high rate of speed across the shearing edge 50, trims the margin as illustrated in Figs.

2 and 5. During the progress of the trimming, the lower edge of the projection 46 guides the shoe by engagement with the insole and thus prevents the insole from touching the blade 76. At the same time, the projection 46, being reciprocated lengthwise in lines crossing the lines of reciprocation of the blade 76, deflects the surplus material upwardly without requiring any appreciable effort on the part of the operator to feed the shoe, since the inertia of the shoe and the last on which it is formed is sufficient to counteract the short rapid thrusts of the projection 46 and the friction due to its engagement with the insole and with the materials being trimmed.

The facility with which the work may be fed as a result of the rapid reciprocations imparted to the projection 46 is of considerable advantage in speeding up the work and in relieving the operator from fatigue. While these reciprocations are advantageous even when only the upper 14 and the lining 16 of a shoe are being trimmed, they are more especially so when the shear members encounter seams, pleats, toe-stiffeners or the forward extremities of the heel-seat-flange 19 (see Fig. 5) of a counter-stiffener, which extremities commonly project into the area to be occupied by a shank-stiffener.

Having thus described my invention, what I claim as new and desire to secure by Letters Patent of the United States is:

1. A trimming machine comprising a movable shear member formed and arranged to run between the insole of a lasted shoe and an overdrawn margin of upper material confronting the insole, mechanism by which said member is operated to flex said margin away from the insole, and means arranged to cooperate with said member to sever the margin with a shearing cut.

2. A trimming machine comprising shearing mechanism including a pair of power-operated shear members arranged to sever surplus material from an overdrawn margin of upper material confronting the insole of a lasted shoe, one of said shear members being formed and arranged to run between said margin and the insole and having a motion by which the margin is separated from the insole to facilitate feeding the shoe.

3. A trimming machine comprising a movable member having a wedge-shaped shearing portion formed and arranged to run between the insole of a lasted shoe and an overdrawn margin of upper material confronting the insole, mechanism arranged to reciprocate said member so that said shearing portion will move to and fro in lines approximately parallel to the confronting surfaces of the insole and said margin, and power-driven means arranged to cooperate with said wedge-shaped portion to sever the margin with a shearing cut.

4. A trimming machine comprising a pair of shear members cooperatively related to sever surplus material from an overdrawn margin of upper material confronting the insole of a lasted shoe, one of said members being formed and arranged to function between said margin and the insole and having an outcurved surface to run on the insole, and mechanism by which said one of the shear members is operated with to-and-fro movements lengthwise of the trimming cut.

5. A trimming machine comprising two movable shear members cooperatively related, one of which is pointed and arranged to run point-foremost between an article of work and a layer of sheet material lying on a surface of such article, mechanism arranged to operate the other one of said shear members to sever said sheet material, and means arranged to reciprocate said pointed shear member in lines substantially parallel to the shearing cut to deflect the sheet material from said surface of the article of work.

6. A trimming machine comprising two movable shear members cooperatively related, one of which is arranged to run between the insole and the overdrawn margin of the upper of a lasted shoe, mechanism arranged to operate the other one of said members to sever said margin, and mechanism arranged to reciprocate the first said one of said members in lines substantially parallel to the shearing cut to facilitate feeding the work.

7. A trimming machine comprising a pair of movable shear members cooperatively related and arranged to sever surplus material from an overdrawn margin of upper material confronting the insole of a lasted shoe, and mechanism arranged to operate said members, one of said members being arranged and operated to move to and fro between said margin and the insole to separate them and thereby facilitate the feeding of the shoe.

8. A trimming machine comprising two reciprocatory shear blades cooperatively related, mechanism arranged to reciprocate one of said blades across the shearing edge of the other, and mechanism arranged to reciprocate said other one of the blades across the lines of reciprocation imparted to the first said one of the blades and during the cutting strokes thereof, whereby a draw shearing cut is effected.

9. A trimming machine comprising two movable shear blades cooperatively related, one of said blades having a pointed wedge-shaped portion arranged to run between the insole of a lasted shoe and surplus material lying on the surface of the insole, said portion having an outcurved surface to engage the insole and a shearing edge to engage the surplus material, mechanism arranged to reciprocate the other one of said blades in lines crossing said shearing edge, and mechanism arranged to reciprocate the first said one of the blades in lines crossing the aforesaid lines.

10. A trimming machine comprising two cooperatively related shear blades one of which is provided with a pointed projection arranged to run point foremost between two confronting elements of an article of work, said projection having a shearing edge extending lengthwise thereof, mechanism arranged to reciprocate said one of said blades lengthwise of said projection, and mechanism arranged to operate the other one of said blades with a shearing movement across said shearing edge.

11. A trimming machine comprising two cooperatively related shear blades one of which is provided with a pointed projection arranged to run point foremost between two confronting elements of an article of work, said projection having a shearing edge extending lengthwise thereof, mechanism arranged to reciprocate said one of said blades in lines lengthwise of said projection, and mechanism arranged to reciprocate the other one of said blades across said lines.

12. A trimming machine comprising two cooperatively related shear blades one of which is provided with a pointed projection arranged to run point foremost between two confronting elements of an article of work, said projection having a shearing edge extending lengthwise thereof, mechanism arranged to reciprocate said one of said blades in lines lengthwise of said projection, and mechanism arranged to reciprocate the other one of said blades across said lines, said two mechanisms being interconnected and timed to synchronize the reciprocations of the blades.

13. A trimming machine comprising a reciprocatory carrier, two cooperatively related shear blades one of which is carried by said carrier and provided with a shearing edge extending across its lines of reciprocation, mechanism arranged to reciprocate said carrier, and mechanism operated by said carrier to reciprocate the other one of said blades across said lines of reciprocation.

14. A trimming machine comprising a pair of cooperatively related shear blades, mechanism arranged to reciprocate one of said blades in lines crossing the shearing edges of the blades, and mechanism arranged to reciprocate the other one of said blades so that its cutting portion will move across said lines, the shearing edge of said other one being inclined with respect to its lines of movement.

15. A trimming machine comprising a pair of reciprocatory shear members cooperatively related, and mechanism arranged to operate said members one with relatively long strokes across the line of the cut and the other with relatively short strokes lengthwise of the cut.

16. A trimming machine comprising a pair of reciprocatory shear members cooperatively related and arranged to execute a draw shearing cut, and mechanism arranged to operate said members one with relatively long strokes and the other with relatively short strokes crosswise of the lines of said long strokes.

17. A trimming machine comprising a pair of shear members cooperatively related, one of said members being constrained to oscillate about an axis and the other being constrained to move in lines transverse to said axis, and mechanism arranged to operate said members one with relatively long strokes and the other with relatively short strokes.

18. A trimming machine comprising a pair of shear members cooperatively related, one of said members being constrained to oscillate about an axis and the other being constrained to move in lines transverse to said axis, a rotary eccentric operating member, and means actuated by said eccentric member for imparting relatively short and relatively long operating strokes to said shear members respectively.

19. A trimming machine comprising two reciprocatory members, shear blades cooperatively related and carried by said members respectively, mechanism arranged to reciprocate one of said members, and a toggle link connecting said members to impart reciprocations of relatively small amplitude to the other one of said members.

20. A trimming machine comprising a pair of shear blades cooperatively related, mechanism arranged to reciprocate one of said blades in lines crosswise of the shearing cut, and a toggle link connecting said blades to reciprocate the other one of them, said other one being arranged to cause its cutting portion to move in lines crossing the first said lines.

21. A trimming machine comprising two reciprocatory blade-holders, means connecting said holders to transmit reciprocatory motion from one to the other and to synchronize their motions, mechanism arranged to reciprocate one of said holders, and a pair of shear blades carried by said holders respectively in cooperative shearing relation, said holders being arranged to cause the shearing portions of the blades to move in lines substantially at right angles to each other.

22. A trimming machine comprising an arcuate blade arranged to be oscillated about an axis and having a shearing edge facing said axis, a chisel-shaped blade arranged in shearing relation to said arcuate blade, mechanism arranged to reciprocate said chisel-shaped blade so that its cutting edge will move to and fro across said shearing edge of the arcuate blade, and mechanism arranged to oscillate said arcuate blade about said axis.

23. A trimming machine comprising a pair of reciprocatory shear members arranged to sever surplus material from an overdrawn margin of upper material lying on the insole of a lasted shoe, one of said members being formed to run between said margin and the insole and being constrained to oscillate about an axis, and mechanism arranged to operate said shear members so that their cutting portions will move substantially at right angles to each other while cutting.

24. A trimming machine comprising two reciprocatory blade-holders one of which is constrained to move in right lines and the other to oscillate about an axis, cooperative shear blades carried by said holders respectively, means arranged to reciprocate one of said holders, and means connecting said holders to transmit operative motion from one to the other.

25. A trimming machine comprising two reciprocatory blade-holders one of which is constrained to move in right lines and the other to oscillate about an axis, cooperative shear blades carried by said holders respectively, a rotary eccentric member arranged to reciprocate the first said one of the holders, and a link connecting said holders to transmit operative motion from said one to said other.

26. A trimming machine comprising a plunger, a chisel-shaped blade carried thereby, mechanism arranged to reciprocate said plunger, a blade-holder arranged to be oscillated about an axis transverse to the lines of reciprocation of said plunger, a blade carried by said holder and having a shearing edge in shearing relation to said chisel-shaped blade, said blades being arranged to execute a draw shearing cut, and a link connecting said plunger and said blade-holder to impart operative motions to the latter.

27. A trimming machine comprising a reciprocatory member, a shearing blade carried thereby, a hinge-pin connecting said blade and said member, means cooperatively related to said blade to form a shearing couple, a spring pivotally mounted on said hinge-pin to maintain said blade against said means, and an adjustable device engaging said reciprocatory member to regulate the applied force of said spring against said blade.

28. A trimming machine comprising two relatively movable shearing members one of which consists of a blade having a cutting portion provided with a shearing edge, a body portion in line with said edge, and a groove in the body portion to receive an edge of the material trimmed by said members.

29. A trimming machine comprising two relatively movable shearing members one of which consists of a blade having a cutting portion provided with a shearing edge, a body portion in line with said edge, and a groove in the body portion to receive an edge of the material trimmed by said members, said edge and said groove being on opposite sides of the blade.

30. A blade for a shearing machine, the blade having a cutting portion provided with a shearing edge, a body portion in line with said edge, and a groove in the body portion to receive an edge of the material trimmed by said cutting portion, said shearing edge and said groove being on opposite sides of the blade.

31. A trimming machine comprising a blade member of segmental arcuate form having an outcurved surface extending from end to end, a concentric incurved surface and a sharp inner edge for shearing, blade-supporting means constructed and arranged to clamp the blade by said outcurved surface and said incurved surface with provision for curvilinear adjustment of the blade lengthwise of said surfaces, a cutter arranged in shearing relation to said sharp inner edge, and mechanism for operating said cutter.

32. A trimming machine comprising an arcuate blade the inner edge of which is a shearing edge, mechanism arranged to oscillate said blade approximately lengthwise of said edge, a cutter arranged in shearing relation to said inner edge, and mechanism for operating said cutter.

33. A trimming machine comprising a cutting blade having a cutting edge formed and arranged to pick up an overdrawn margin of upper material lying on the insole of a lasted shoe, mechanism arranged to reciprocate said blade lengthwise of said edge, and means arranged to cooperate with said cutting edge to sever the said margin with a shearing cut.

34. A trimming machine comprising a segmental arcuate blade, a cutter arranged in shearing relation to a longitudinal inner edge of said blade, and operating mechanism arranged to move said blade endwise in a curved path to cooperate with said cutter.

35. A trimming machine comprising two cooperative cutting members having cutting edges in shearing relation, one of said members being an arcuate blade of which the cutting edge extends lengthwise and is toward the center of curvature of the blade, and mechanism arranged to operate said blade with oscillatory movement lengthwise thereof.

36. A trimming machine comprising a segmental arcuate blade of which a portion of the longitudinal inner edge is a cutting edge, means by which said blade is supported with provisions for longitudinal adjustment thereof, a cutter arranged in shearing relation to said cutting edge, and mechanism for operating said cutter.

37. A trimming machine comprising an arcuate blade having a cutting edge extending lengthwise on its inner side, a cutter having a cutting edge in shearing relation to the first said cutting edge, and mechanism arranged to operate both said blade and said cutter with dissimilar motions.

38. A trimming machine comprising two cooperative cutting members having cutting edges in shearing relation, one of said edges being formed and arranged to pick up an overdrawn margin of upper material lying on the insole of a lasted shoe, and mechanism arranged to operate said cutting members with dissimilar motions.

In testimony whereof I have signed my name to this specification.

JOHN B. HADAWAY.